Figure 7:
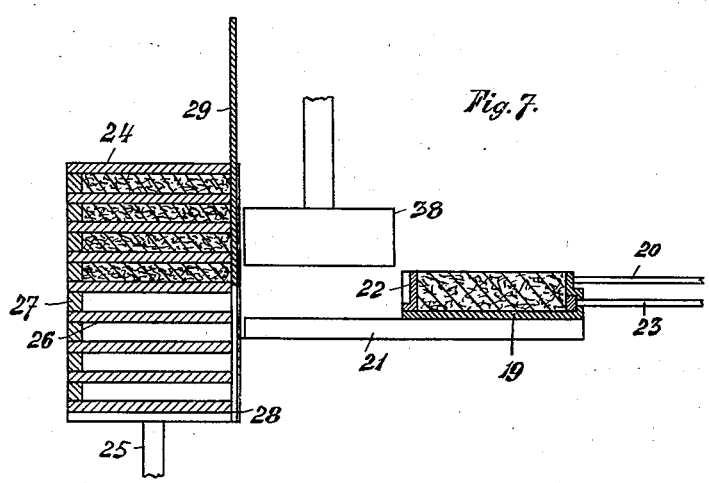

July 29, 1941.   V. EHRENHAFT   2,250,576
PROCESS AND APPARATUS FOR THE MANUFACTURE OF PROFILED BRICKS
Filed Aug. 19, 1939   2 Sheets-Sheet 1
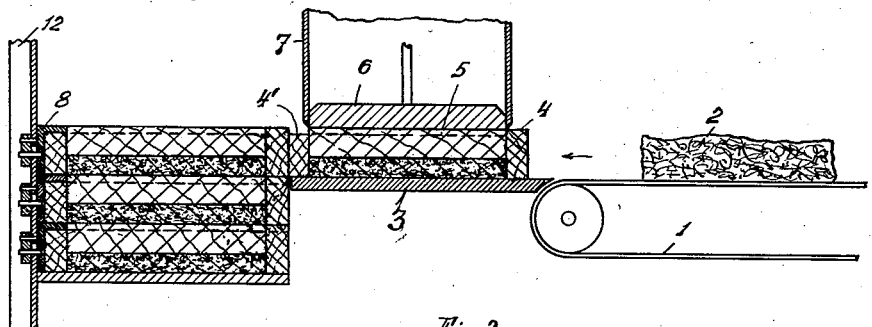
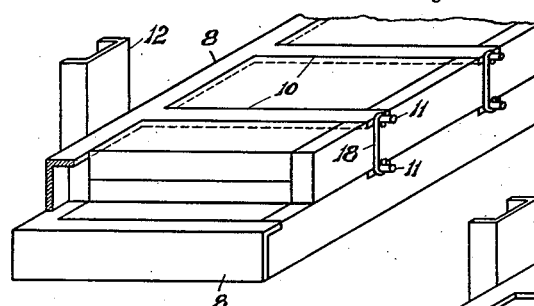
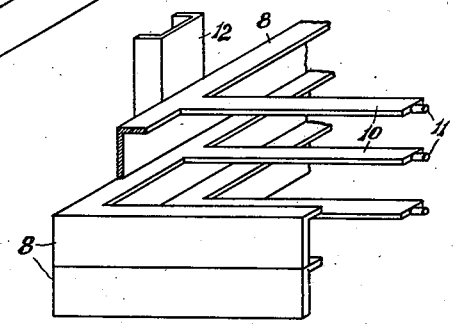
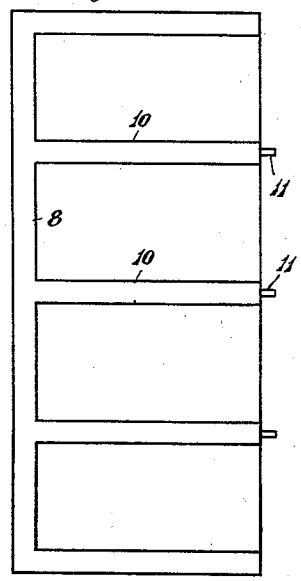
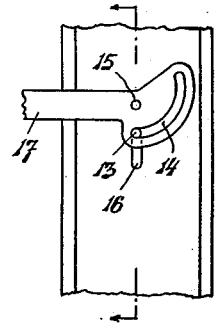
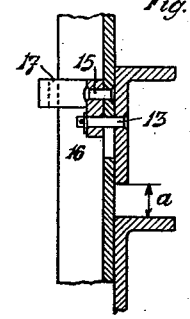
Inventor.
Viktor Ehrenhaft Inventor.
Viktor Ehrenhaft Patented July 29, 1941

2,250,576

UNITED STATES PATENT OFFICE 2,250,576

PROCESS AND APPARATUS FOR THE MANUFACTURE OF PROFILED BRICKS

Viktor Ehrenhaft, Brunn, Moravia

Application August 19, 1939, Serial No. 290,986
In Czechoslovakia July 13, 1938

15 Claims. (Cl. 25—45)

This invention relates to a process and apparatus for the manufacture of molded bricks, in particular, slabs made from a material, such as for example wood wool and cement, which on compression tends to increase its volume.

Slabs made from wood wool and a mineral binding means are known. Preferably Sorel cement is used as binding means, wood wool mixed with mortar being fed to profiled brick molding machines which by means of thrust rollers, about which steel belts are conveyed, will flatten the material until it obtains the thickness desired. The belts which convey an interposed wet strip, from which light building-slabs will be made, are carried through a heated conduit, the cement setting in ten to fifteen minutes. A short stage within a drying stove will follow, whereupon the strip is cut into slabs.

If ordinary cement, such as Portland cement, be used as binding means for wood wool, the slabs must be formed within molds kept under pressure for at least eighteen hours, lest the material may widen the mold. A pile of molds with their bricks enclosed is carried by a carriage and compressed by a spindle press, and then the said pile is fixed with irons. Thereupon, the pressure of the spindle press may be reduced, and the pile removed to be dried. Or, alternatively, each compressed slab is clamped to its mold and the molds with the slabs enclosed are clamped to form a pile, whereupon the clamping devices of the single molds may be removed.

Either of the modes of production of slabs made from wood wool and ordinary cement, such as Portland cement, is complicated and does not allow of mass production.

According to my invention, mass production of slabs made from wood wool and cement mortar, such as Portland cement, and dried at the temperature of the air is rendered feasible in the following manner: Immediately after compression, the pressed slabs are laterally shifted along the pressing surface of the die and into a piling device, which will prevent the material from which the bricks are made, from swelling in excess of the extent admissible.

When being displaced from the press into the piling device, the profiled brick may either remain within the mold, in which it was compressed, or such mold may be retained within the press and the newly compressed brick alone may be shifted into the piling device. During such displacement, either the compression pressure is maintained, or compression is previously increased in a manner known per se, until the thickness of the molded brick is less than the definitively desired thickness, when the die is released and the molded brick pushed out. The molded bricks will remain within the piling device until they are hardened and will be prevented from swelling in excess of the definitive volume desired.

Figure 8:
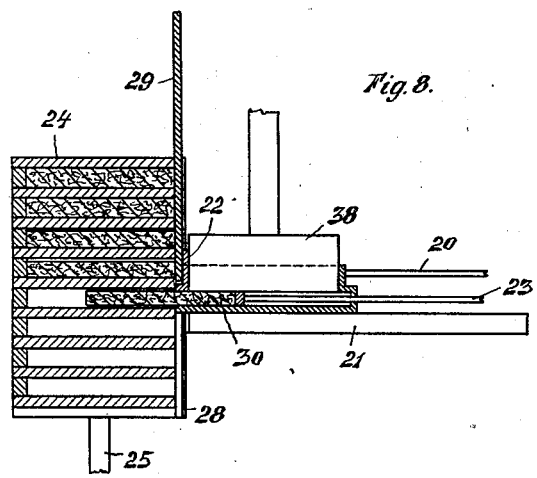
Figure 9:
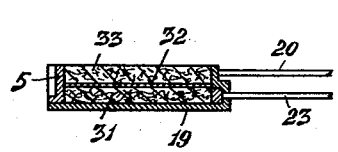

In the drawing, embodiments of the invention are shown by way of example. Figure 1 shows, diagrammatically, the production process, the profiled bricks together with their molds being shifted from the press into the piling device. Figures 2 and 3 are perspective views of the clamping device for the piled-up molds with the molded bricks enclosed therein. Figure 4 is a plan view of the clamping device. Figures 5 and 6 show a view and section respectively of a detail of the clamping device. Figures 7 and 8 are diagrams of the production process showing the alternative where the mold is retained within the press and only the profiled brick is shifted into the stacking-up device. Figure 9 illustrates an arrangement in which two slabs separated by a partition wall are simultaneously compressed in one and the same mold.

In Figure 1 is shown a conveyor belt 1 carrying and feeding from the right to the left one cake 2 after the other, which cakes are made from the said material. Such cake is then fed to a working table 3, where it is placed into a mold 4, consisting of a wooden frame. On the cake lying on table 3 is placed a lid 5, which fits into frame 4, and is pressed by a die 6, which is adapted to be moved up and down in guideways 7. By the pressing process a slab of the said material is formed and compressed to the measurements required. If the die 6 were then lifted, the swelling material would lift the lid 5. To prevent this, according to the invention the molded brick together with its mold, pressure thereon being maintained, is laterally displaced in the direction of the arrow, and that in such manner that the lid of the mold is retained on its level. For that purpose, a piling-up device is arranged as annex to table 3 on the left thereof and adjacent thereto, which device substantially comprises a plurality of iron frames 8 made from angle irons and arranged in direct superposition. The lengths of the perpendicular sides of the angle irons 8 are made to correspond to the height of a ledge 4' used for the formation of the mold frame. If now the mold 4 with its brick 9 enclosed and lid 5 are shifted to the left, the angle iron 8 being arranged at a corresponding height, ledge 4' will exactly fit into angle iron 8, whereby it is fixed therein. Since the mold is of substantial length, it is necessary to mount cross bars in order to prevent the lid 5 from being deflected due to the swelling of the mass. Such cross braces 10 are welded to the horizontal flange of angle iron 8 and located in recesses arranged within the upper surface of lid 5. If bolts 11 are mounted on the cross braces 10 and fixed by means of a locking bolt 18, deflection of the lid 5 will be impossible. A brick with its mold thus locked within the iron frame which serves as retaining device, the latter is moved downward by one space, whereupon the next mold with its brick compressed meanwhile is shifted in. In the piling-up device, the bottom face of any one brick will thus (always) rest on the lid of the mold underneath. The downward movement, by one space, of the assembled iron frames 8 is effected in such manner that these frames are secured to an U-iron 12, which is moved downward.

The shifted-in parts will remain within the pile until the brick is completely hardened. For dismantling the bricks, which dismantling takes place from the top to the bottom, one mold after the other together with its brick and lid is slightly lifted from the pile underneath. This may be effected, for example, by having the frames 8 not fixedly connected to the U-irons 12, but allowing of a relative displacement of the single frames toward the said U-iron 12 in a vertical direction.

In Figures 5 and 6 such displacement is shown by way of example. Within the angle iron, from which frame 8 is made, is fixed a bolt 13 adapted to move in a link 14. The said link turns about a bolt 15 secured to the U-iron 12. The slit of the link is eccentric relatively to bolt 15, about which turns the link. A vertical slit 16 is arranged in the U-iron in which the bolt 13 may be displaced. If by means of a projecting lever 17 made of a piece with the said link, link 14 is brought into the position shown in the drawings; the frame 8 will be lifted from the frame underneath by the length a. The mold gripped between the two frames may now be easily removed from the pile and the brick taken out. In this manner, progressing from the top downward, one brick after the other is dismounted.

Figures 7 and 8 show a modification of the process of manufacture described.

38 is a die, 19 is a trough-shaped mold adapted to be slid on support 21 by means of a drive 20, when die 38 is in a lifted position according to Figure 1. The mold 19 has a partition wall 22 adapted to be displaced as to its elevation, and an ejecting device 23 is submerged in the opposite partition wall. Laterally to the press, a piling-up device 24 is arranged, which may be gradually lifted by means of a device 25. The piling-up device comprises a plurality of superposed shelves which are open on the sides directed toward the press, and is composed of boards 26 and frames 27 open on one side and interposed between these boards, which frames are interconnected by connecting members not shown. On the side facing the press, the piling device 24 is provided with guideways 28 in which slides a closing-wall 29. By means of a member not shown the said wall is retained on its level relatively to the support 21.

The process of manufacture is the following: The compressing mold 19 is brought into the position (shown in Figure 7) in which it is outside of the press and appears to be easily accessible for the purpose of being filled with material. After being filled, the mold 19 is shifted so as to lie under die 38, which now will effect its working stroke, thereby compressing the material to the thickness desired. The said stroke achieved, wall 22 is lifted, the ejecting device 23 is set going and will shift the just compressed and still soft slab 30 from the mold 19 into the corresponding ready and open shelf of the piling-up device 24. This phase is shown in Figure 8.

Thereupon the said ejecting device will be restored to its initial position, the wall 22 is moved downward and the compressing mold 19 is removed from the press in order to be recharged with material. Meanwhile the piling or stacking-up device 24 has been moved upward in order to keep the next empty shelf ready for another ejecting stroke. The piling device 24 being moved upward relatively to the clamped closing wall 29, this wall will successivey shut up the previousy filled shelves. When the said piling device is entirely filled, it is replaced by another, the full pile being removed until the slabs have hardened. When being dismantled, the finished slabs may be easily removed therefrom.

As mentioned before, the said slabs, in a manner known per se, may be compressed to a thickness less than their definitive thickness. Thereby it will not only become possible to use thinner partition walls 26 in the stacking-up device 24, because the swelling force of the material has been reduced, but also the shifting-in into the shelves of the piling device of the newly compressed slabs will be facilitated. It is then advisable in order to reduce friction to slightly raise the die 38 after each working stroke thereof, but only to such extent as to ensure guidance of the newly compressed slabs, while they are being ejected.

The embodiment described by way of example will allow of several modifications. Thus, the compressing mold 19 may not be arranged to be displaced, but fixed below the said compressing die 38, in case this die is formed in such manner that, when lifted, it will allow free access to the compressing mold 19 in order to allow filling thereof. Also it would be possible to utilise in the place of a transportable trough-shaped mold 19, a fixed channel of rectangular section and make transportable only the wall which includes the submerged ejecting device 23, in which case the material fed to the channel sideward to the press would have to be conveyed to below the die 38 by the transportable wall. In certain cases, also the closing wall 29 may be done without, if no particular value is attached to exactly formed edges of the slabs.

The process described should be considered to be a remarkable improvement, inasmuch as there is no need of the former customary handling of molds and mold parts in the press, whereby the output of the machine is considerably increased and rational utilization thereof rendered possible. Since no pressure is applied to the walls of the piling-up device, which is destined to receive the slabs during the hardening process, their lifetime is substantially longer than it is the case with the known methods, where each of the great number of setting molds or, at least, some of their parts together with the slabs to be formed are exposed to compression pressure. The movements of the individual machine parts and the regular succession thereof may be produced either by hand or from a hydraulic electric pneumatic or other drive in a manner known per se.

In the manufacture of particularly thin slabs, it may seem rational to simultaneously press more than one slab. For that purpose, mold 19 is first charged with a layer of material 31 (see Figure 9) covered with a partition wall 32 and another layer of material 33 is placed thereupon. Pressure having been applied, both slabs together with their partition wall are ejected and shifted together into the same shelf of the piling-up device.

What I claim is:

1. Process of manufacturing profiled bricks of a material which after compression tends to increase its volume, comprising the steps of compressing said material in a molding press to a profiled brick, laterally shifting said molded profiled brick while still wet along the pressing surface of said press directly into a piling-up device, in which piling-up device swelling of the material of which the bricks are made, beyond the desired volume is prevented and in which piling-up device said bricks are allowed to harden.

2. Process of manufacturing profiled bricks of a material which after compression tends to increase its volume, comprising the steps of compressing said material in a molding press to a thickness being less than the thickness desired for the finished profiled brick, laterally shifting said molded brick while still wet along the pressing surface of said press directly into a piling-up device, in which piling-up device swelling of the material of which the bricks are made, beyond the desired volume is prevented and in which piling-up device said bricks are allowed to harden.

3. Process of manufacturing profiled bricks of a material which after compression tends to increase its volume, comprising the steps of compressing said material in a molding press to a thickness being less than the thickness desired for the finished profiled brick, diminishing thereafter the pressure exerted on said material, laterally shifting said molded brick while still wet along the pressing surface of said press directly into a piling-up device, in which piling-up device swelling of the material of which the bricks are made, beyond the desired volume is prevented and in which piling-up device said bricks are allowed to harden.

4. Process of manufacturing profiled bricks of a material which after compression tends to increase its volume, comprising the steps of compressing said material in a molding form of a molding press to a profiled brick, laterally shifting said brick, while still wet, together with the molding form in which it is molded along the pressing surface of said press directly into a piling-up device, in which piling-up device swelling of the material of which the bricks are made, beyond the desired volume is prevented and in which piling-up device said bricks are allowed to harden.

5. Process of manufacturing profiled bricks of a material which after compression tends to increase its volume, comprising the steps of compressing said material in a molding form of a molding press to a thickness being less than the thickness desired for the finished profiled brick, laterally shifting said brick, while still wet, together with the molding form in which it is molded along the pressing surface of said press directly into a piling-up device, in which piling-up device swelling of the material of which the bricks are made, beyond the desired volume is prevented and in which piling-up device said bricks are allowed to harden.

6. Process of manufacturing profiled bricks of a material which after compression tends to increase its volume, comprising the steps of compressing said material in a molding form of a molding press to a thickness being less than the thickness desired for the finished profiled brick diminishing thereafter the pressure exerted on said material, laterally shifting said brick, while still wet, together with the molding form in which it is molded along the pressing surface of said press directly into a piling-up device, in which piling-up device swelling of the material, of which the bricks are made, beyond the desired volume is prevented and in which piling-up device said bricks are allowed to harden.

7. Process of manufacturing profiled bricks of a material which after compression tends to increase its volume, comprising the steps of compressing said material in at least two molding forms of one molding press simultaneously into at least two profiled bricks, laterally shifting said bricks, while still wet, together with the molding forms in which they are molded along the pressing surface of said press directly into a piling-up device, in which piling-up device swelling of the material, of which the bricks are made, beyond the desired volume is prevented and in which piling-up device said bricks are allowed to harden.

8. Process of manufacturing profiled bricks of a material which after compression tends to increase its volume, comprising the steps of compressing said material in at least two superposed molding forms of one molding press, simultaneously into at least two profiled bricks, laterally shifting said bricks, while still wet, together with the molding forms in which they are molded along the pressing surface of said press directly into a piling-up device, in which piling-up device swelling of the material, of which the bricks are made, beyond the desired volume is prevented and in which piling-up device said bricks are allowed to harden.

9. In a machine for manufacturing profiled bricks of a material which after compression tends to increase its volume, in combination, a press, a pressing form cooperating with said press, a piling-up device arranged alongside of said pressing form, a mechanism for step-by-step displacement of said piling-up device, and transferring means combined with said pressing form and said piling-up device, being adapted to transfer said pressing form together with the pressed profiled bricks into said piling-up device, said transferring means being arranged in such a manner as to prevent swelling of the freshly pressed profiled brick beyond the volume desired for the finished bricks.

10. In a machine according to claim 9, an ejecting device adapted to transfer said pressing form together with the freshly pressed profiled brick along the pressing surface of the die into the piling-up device, said ejecting device being arranged in such a manner as to prevent swelling of the freshly pressed profiled brick beyond the volume desired for the finished bricks.

11. In a machine for manufacturing profiled bricks of a material which after compression tends to increase its volume, in combination a press, a piling-up device arranged alongside of said press, a mechanism for step-by-step displacement of said piling-up device, a pressing form within said press, said pressing form comprising side walls, one of said side walls being adapted to be displaced in such a manner as to serve as ejection opening for the pressed bricks, an ejecting device for ejecting the pressed bricks along the inner surface of said pressing form into said piling-up device, said ejecting device being arranged in the opposite wall of said pressing form and being adapted to be operated from outside of said press.

12. An apparatus for manufacturing profiled bricks of a material which after compression tends to increase its volume, comprising a press for compressing said material into bricks, a piling-up device into which said compressed bricks are transferred, said piling-up device provided with a mechanism for the gradual displacement of said piling-up device and with means for preventing inadmissible swelling of the compressed bricks, a trough-shaped compressing mold comprising side walls, one of said side walls being adapted to be displaced in such a manner as to serve as ejection opening for laterally transferring said compressed bricks from said press into said piling-up device, an ejecting device submerged in the side wall opposite to the side wall serving as ejection opening, and shelves arranged within said piling-up device, said shelves being open toward said press.

13. An apparatus for manufacturing profiled bricks of a material which after compression tends to increase its volume, comprising a press for compressing said material into bricks, a piling-up device into which said compressed bricks are transferred, said piling-up device provided with a mechanism for the gradual displacement of said piling-up device and with means for preventing inadmissible swelling of the compressed bricks, a trough-shaped compressing mold comprising side walls, one of said side walls being adapted to be displaced in such a manner as to serve as ejection opening for laterally transferring said compressed bricks from said press into said piling-up device, an ejecting device submerged in the side wall opposite to the side wall serving as ejection opening, shelves arranged within said piling-up device, said shelves being open toward said press, and said piling-up device being provided with guideways for the reception of a fixed closing wall, which during the gradual displacement of the piling-up device will shut off the open shelves of the said device after they are being filled with bricks.

14. An apparatus for manufacturing profiled bricks of a material which after compression tends to increase its volume, comprising a press for compressing said material into bricks, a piling-up device into which said compressed bricks are transferred, said piling-up device provided with a mechanism for the gradual displacement of said piling-up device and with means for preventing inadmissible swelling of the compressed bricks, a trough-shaped compressing mold comprising side walls, one of said side walls being adapted to be displaced in such a manner as to serve as ejection opening for laterally transferring said compressed bricks from said press into said piling-up device, an ejecting device submerged in the side wall opposite to the side wall serving as ejection opening, shelves arranged within said piling-up device, said shelves being open toward said press, said piling-up device being provided with guideways for the reception of a fixed closing wall, which during the gradual displacement of the piling-up device will shut off the open shelves of the said device after they are being filled with bricks, said piling-up device being composed of level slabs and frames secured together by clamping means.

15. An apparatus for manufacturing profiled bricks of a material which after compression tends to increase its volume, comprising a press for compressing said material into bricks, a piling-up device into which said compressed bricks are transferred, said piling-up device provided with a mechanism for the gradual displacement of said piling-up device and with means for preventing inadmissible swelling of the compressed bricks, a trough-shaped compressing mold comprising side walls, one of said side walls being adapted to be displaced in such a manner as to serve as ejection opening for laterally transferring said compressed bricks from said press into said piling-up device, an ejecting device submerged in the side wall opposite to the side wall serving as ejection opening, shelves arranged within said piling-up device, said shelves being open toward said press, and said piling-up device being provided with guideways for the reception of a fixed closing wall, which during the gradual displacement of the piling-up device will shut off the open shelves of said device after they are being filled with bricks, said piling-up device being composed of superimposed level slabs and frames secured together by clamping means, said superimposed slabs and frames being provided with loosening and lifting mechanisms.

VIKTOR EHRENHAFT.